(12) United States Patent
Chen et al.

(10) Patent No.: US 11,644,814 B2
(45) Date of Patent: May 9, 2023

(54) METHOD AND APPARATUS FOR COORDINATING THE UTILIZATION OF OPERATIONAL ZONES TO ACHIEVE PRODUCTION GOALS

(71) Applicant: ABB Schweiz AG, Baden (CH)

(72) Inventors: Shih-Chin Chen, Dublin, OH (US); Abhay Anand, Singapore (SG); Balaji Sr, Singapore (SG)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/689,771

(22) Filed: Nov. 20, 2019

(65) Prior Publication Data

US 2021/0149370 A1   May 20, 2021

(51) Int. Cl.
*G05B 13/04* (2006.01)
*G05B 19/4155* (2006.01)

(52) U.S. Cl.
CPC ....... *G05B 19/4155* (2013.01); *G05B 13/048* (2013.01); *G05B 2219/31025* (2013.01)

(58) Field of Classification Search
None
See application file for complete search history.

(56) References Cited

U.S. PATENT DOCUMENTS

| 5,351,184 | A | 9/1994 | Lu et al. |
| 5,758,047 | A | 5/1998 | Lu et al. |
| 6,839,599 | B2 | 1/2005 | Martin et al. |
| 7,376,472 | B2 | 5/2008 | Wojsznis et al. |
| 8,036,758 | B2 | 10/2011 | Lu et al. |
| 8,155,932 | B2 | 4/2012 | Berggren et al. |
| 2002/0016640 | A1* | 2/2002 | Gagne ................. G05B 13/048 700/29 |
| 2003/0018399 | A1 | 1/2003 | Havener et al. |
| 2007/0156259 | A1 | 7/2007 | Baramov et al. |
| 2007/0168057 | A1* | 7/2007 | Blevins ............... G05B 13/022 700/53 |
| 2010/0198364 | A1* | 8/2010 | Chen .................... F01D 5/3015 700/8 |
| 2013/0179235 | A1 | 7/2013 | Treiber et al. |
| 2014/0371920 | A1* | 12/2014 | Varadi ..................... F24F 11/30 700/276 |
| 2015/0316946 | A1 | 11/2015 | Wenzel et al. |
| 2016/0320770 | A1 | 11/2016 | Zheng et al. |
| 2018/0275621 | A1* | 9/2018 | Kniazev .............. G05B 13/048 |
| 2019/0391571 | A1* | 12/2019 | Urich ................. B01D 53/0454 |

OTHER PUBLICATIONS

Seborg et al., Process Dynamics and Control, (2011), Chapter 20 entitled Model Predictive Control, pp. 414-438.
International Searching Authority / US, International Search Report & Written Opinion issued in corresponding Application No. PCT/US2016/061183, dated Feb. 9, 2021, 8 pp.

* cited by examiner

*Primary Examiner* — Ryan A Jarrett
(74) *Attorney, Agent, or Firm* — Leydig, Voit & Mayer, Ltd.

(57) ABSTRACT

A system, method, and apparatus is provided for production processes to coordinate the utilization of the operational zone for process variables and automate the execution of the target settings to maximize the production goals without requiring human intervention.

18 Claims, 3 Drawing Sheets

METHOD AND APPARATUS FOR COORDINATING THE UTILIZATION OF OPERATIONAL ZONES TO ACHIEVE PRODUCTION GOALS

BACKGROUND

The present disclosure relates in general to production, process controls, and, more particularly, to improving the control of production processes by coordinating target settings for the variables utilized in the production process to achieve desired production goals.

There are typically multiple input variables that are important to a process for producing products with various properties, along with process output variables such as throughputs of the production. For example, a paper machine may involve input variables such as different refined fibers, chemical additions, dyes, water, steam, electricity, various flows, pressures, temperatures, and speed settings to produce paper sheet with different output variables such as basis weight, moisture, thickness, strength, color, and other properties. The relationships between these input variables and output variables of the process are complex. Even experienced and skilled operators cannot always find the right settings for the input and output variables to produce products that meet various production goals, such as maximizing production throughput while minimizing fiber, chemical, and energy usage and achieving the desired quality specifications for the product.

Advanced process control, such as multi-variable model predictive control (MPC), has been applied in a broad range of industries to gain better product quality and more stable operations while producing the product. However, the targets for the variables that are used under advanced process controls may still be determined by human operators based on their experience and skill. The preferred variable targets are therefore hardly achieved through the target settings that are established by the human operators. As a result, there is a need to coordinate the target setting for the variables used in advanced control schemes to follow and/or maximize the economic goals of the process by effectively utilizing the operational zones of the variables. The present disclosure is directed to a system, method, and apparatus to achieve these ends, among others.

SUMMARY

In accordance with the present disclosure, a system, method, and apparatus is provided for production processes to coordinate target settings for process variables and to automate the execution of the target settings to maximize the production goals without requiring human intervention. As a result, savings can be realized on various input variables, such as raw materials, resources, and energy consumption, while achieving output variables that provide the desired product specification. In addition, less expensive materials and resources may also be able to be employed in the production process while improving operations and reducing human effort and errors. Also provided in accordance with the present disclosure is a computer control system that is operable to perform the foregoing.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings

BRIEF DESCRIPTION OF THE DRAWINGS

The features, aspects, and advantages of the present invention will become better understood with regard to the following description, appended claims, and accompanying drawings where:

DETAILED DESCRIPTION OF ILLUSTRATIVE EMBODIMENTS

Figure 1:
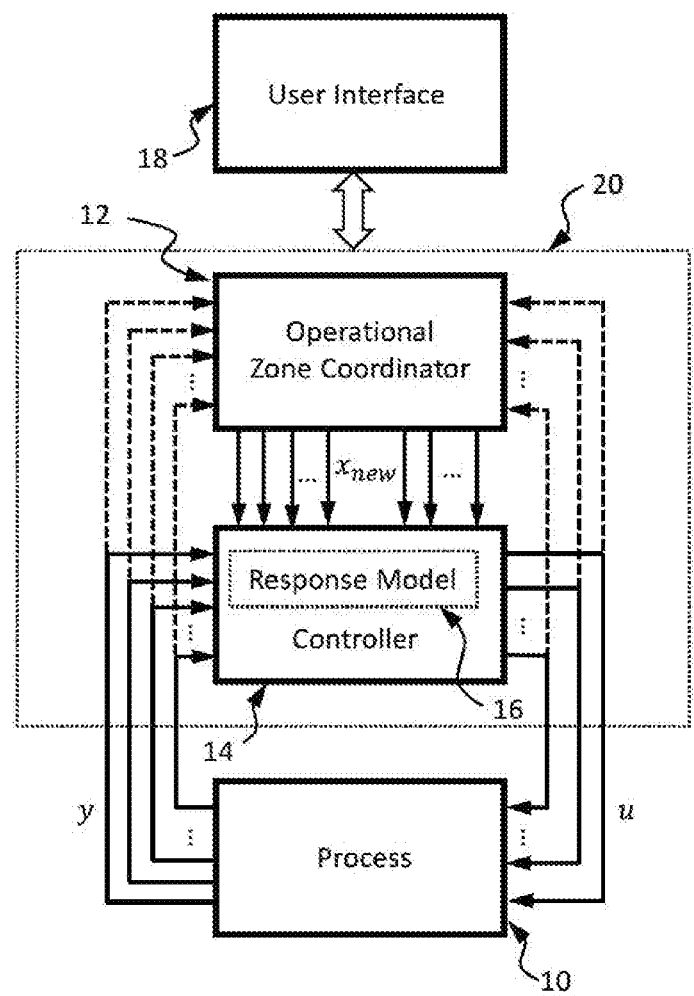
FIG. 1 shows a schematic view of an exemplary system that utilizes an operational zone coordinator in conjunction with a controller for a production process.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

For any production process 10, a set of input variables u and a set of output variables y can be identified as shown in FIG. 1. FIG. 1 also includes a computer control system 20 that receives output variables y from process 10 and creates input variables u to process 10. The computer control system 20 may include, but is not limited to, an operational zone coordinator 12 and a process controller 14 which may utilize an internal response model 16 of the process 10. The computer control system 20 is connected to a process 10 with one or more machines that are operable to produce a product using target settings established by the operational zone coordinator 12 that utilizes the operational zones of the input variables u and output variables y according to the present disclosure.

The process controller 14 comprises one or more controllers and/or one or more computers. The computer control system 20 may further include one or more other computers for performing off-line tasks related to the production process and/or the process controller 14. At least one of the computers of the computer control system 20 has access to user interface devices (UI) 18 that include one or more display devices, such as a monitor (with or without a touch screen) or a hand-held device such as a smart, phone, tablet, laptop computer, or other device cell phone for displaying graphics, and one or more entry devices, such as a keyboard, a mouse, a track ball, joystick, a hand-held device, and/or voice-activated device.

The process input variables u in FIG. 1 are also identified herein as manipulated variable or variables (MV). The process output variables y in FIG. 1 are also identified herein as controlled variable or variables (CV). The input variables MV can influence the output variables CV in many different ways. MV also typically exhibit both static and dynamic impacts on CV, and these static and dynamic impacts can be identified as a response model 16 that is used in process controller 14. The response model 16 can be implemented in many different mathematical representations such as transfer functions, state-space equations, neural networks, and other mathematical functions.

Regardless of which response model representation is used, the goals of production processes are often set to utilize the minimum amount of input materials, resources, and time to produce maximum amounts of product with the desired qualities in the most efficient manner. These production goals are common for many production processes.

Figure 2:
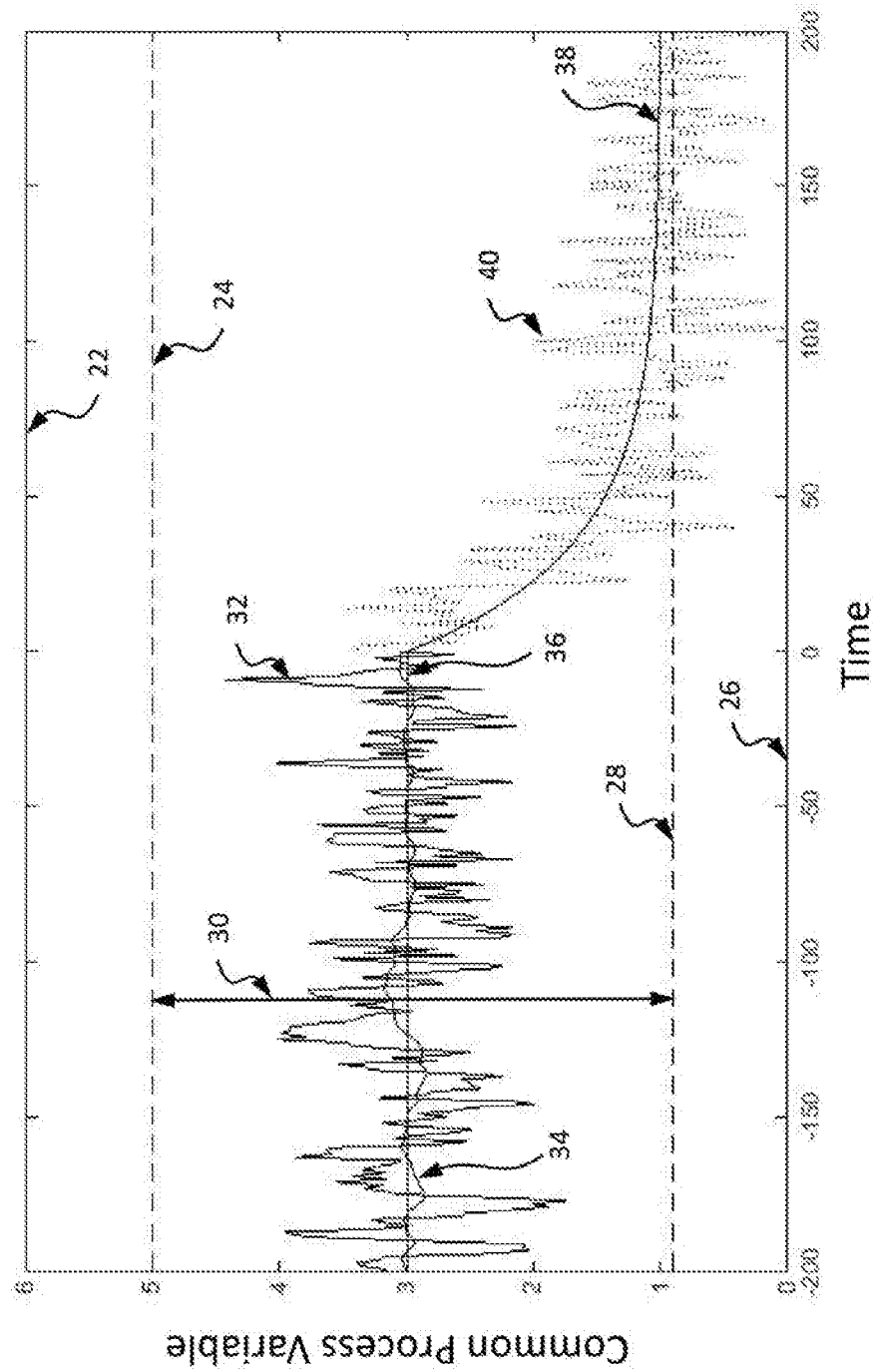
FIG. 2 shows a graph for an exemplary process variable with high and low limits, associated tolerances, operational zone, and relationship between the process variable and its current and future targets.

For any given production process, even though achieving the production goals as stated above is a main priority, a production process may be constrained by its physical limitations as well. For example, the input variables MV of a process typically have physical range between a high limit and a low limit, along with rate limits, tolerances, and/or target settings. The output variables CV typically must meet certain high, low, or target specifications as well. FIG. 2 is an exemplary graph that illustrates a typical process variable MV or CV. The illustrated process variable includes a high limit ($L_h$) 22, a high tolerance ($t_h$) 24, a low limit ($L_l$) 26, and a low tolerance ($t_l$) 28. The operational high limit $z_h$ is the high limit 22 minus the high tolerance 24, i.e. $z_h = L_h - t_h$. The operational low limit $z_l$ is the low limit 26 plus the low tolerance 28, i.e., $z_l = L_l + t_l$. The region between the operational high limit $z_h$ and the operational low limit $z_l$ is the operational zone 30. Process variable 32 and its long-term trend 34 are typical within this operational zone around its target 36. The operational zone coordinator 12 according to the present disclosure produces the new target 38 for moving the future process variable 40 toward the new target 38, for example, closer to the lower end of the operational zone 30. Other new targets 38 are also contemplated within the operational zone 30 as discussed herein.

The tolerances 24, 28 allow a process variable (either MV or CV) a sufficient degree of freedom to vary and yet achieve either the economic goals of minimizing production costs or keeping product within its quality specifications. Tolerances 24 and 28 can be specified by a human user and/or derived and updated dynamically based on short-term variability of the difference between the process variable 32 and its long-term trend 34. Tolerances are set larger if the short-term variability is higher.

A high degree of skill and training is needed for a human operator to manually operate a production process to achieve the stated production goals while attempting to satisfy the various constraints. The present disclosure provides a system, method and apparatus to automatically maximize production goals while coordinating the utilization of process operational zones for the input variables and output variables. For example, for a process with static gain of G, its steady-state manipulated variables MV(u) and controlled variables CV(y) can be expressed as:

$$y - y_k = G(u - u_k) \quad \text{Equation 1}$$

where MV and CV can be combined as a common process variable x:

$$x = \begin{bmatrix} y \\ u \end{bmatrix} \quad \text{Equation 2}$$

Figure 3:
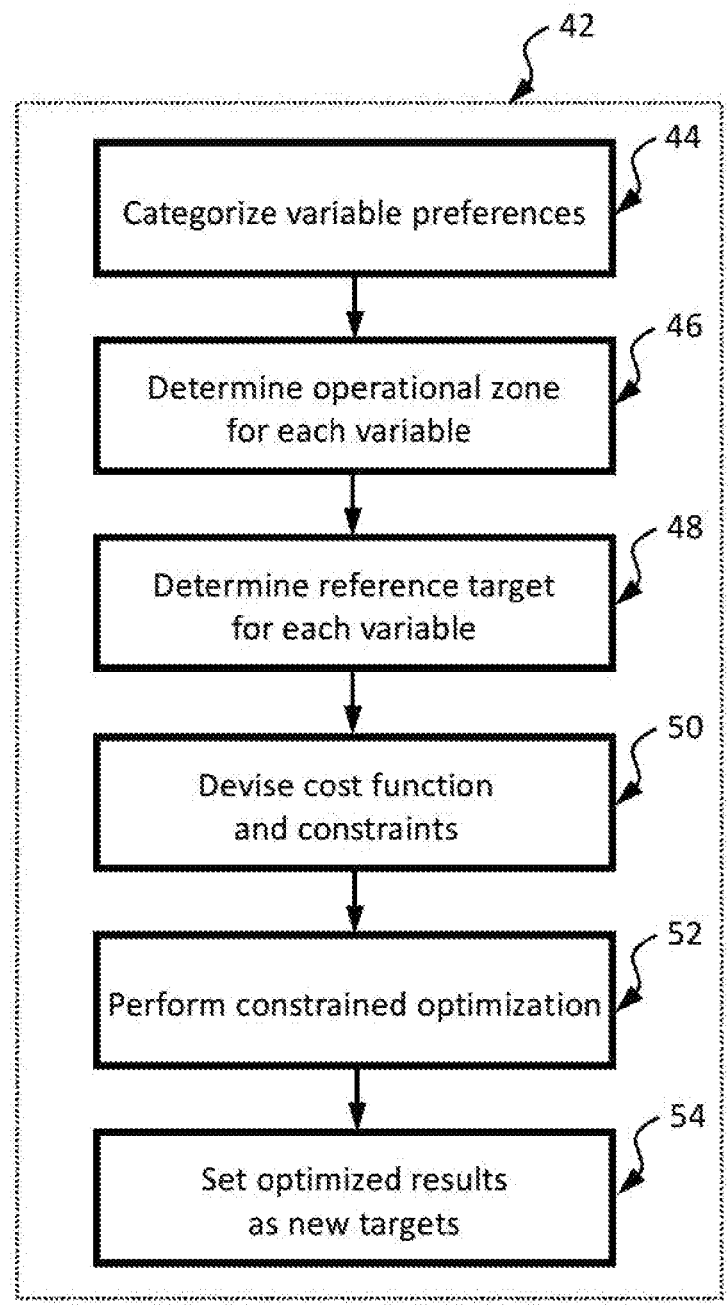
FIG. 3 is a flow diagram of a procedure for an operational zone coordinator for coordinating target settings for production process variables.

Referring to FIG. 3, a procedure 42 is shown for a method that is operable by the operational zone coordinator 12 in a computer control system 20 according to the present disclosure. Procedure 42 includes an operation 44 to categorize preferences of each element of the common process variable x. Within the operational zone of each element of the common process variable x, different positions may be associated with different preferences for achieving operational goals. For example, each element of the common process variable x can be designated in one of the following four preference categories, regardless of whether the variable is an input variable or an output variable.

Set target (SP): preference for a common process variable x that has an explicit target to be achieved or maintained. For example, a basis weight target for a paper sheet or temperature target in a lime kiln operation.

Near high (NH): preference for a common process variable x that does not have an explicit target, but needs to be kept as close to a high operational zone limit as possible but not exceeding its high limit.

Near low (NL): preference for a common process variable x that does not have an explicit target, but needs to be kept as close to a low operational zone limit as possible but not exceeding its low limit.

Within range (WR): preference for a common process variable x that does not have an explicit target, but needs to be kept at any level between high and low operational zone limits.

Procedure 42 continues at operation 46 to determine the operational zone for each common process variable x. For each common process variable in x, the operational zone can be specified based on high and low limits and their corresponding tolerances. As shown in FIG. 2, the high limit 22 is $L_h$ and the low limit 26 is $L_l$ for each common process variable x. The high and low tolerances 24 and 28 ($t_h$ and $t_l$) may also be specified. The operational zone 30 is the region between the high zone limit, $z_h = L_h - t_h$ and the low zone limit, $z_l = L_l + t_l$. The operational zone 30 is specified with $Z_h$ and $z_l$.

Procedure 42 continues at operation 48 to determine a reference target for each common process variable x, such as a reference target ($x_r$). The reference target $x_r$ for a set target (SP) common process variable can be set to the same as its explicit manual target. The reference target xi for a near high (NH) common process variable can be set to its high operational zone limit ($x_r$, $Z_h$). The reference target $X_r$ for a near low (NL) common process variable can be set to its low operational zone limit ($x_r = z_l$). The reference target $x_r$ for a within range (WR) common process variable can be set to its current long-term steady-state value ($x_r = x_{ss}$).

Procedure 42 continues at operation 60 to devise a cost function and constraints. The cost function can be devised as a weighted sum of deviation variance of common process variables in x from their reference targets as specified above.

$$J = (x - x_r)^T W (x - x_r) \quad \text{Equation 3}$$

where $x_r$ is the reference target for common process variable x as defined above in operation 48 and W is a diagonal matrix where each diagonal element specifies the weight factor of each element of the common process variable x.

Both the operational zone limits and the response model 16 of the process can be combined as a complete set of constraints. The high and low zone limits can be express as:

$$z_l < x < z_h \quad \text{Equation 4}$$

where $z_l$ and $Z_h$ are low and high zone limits respectively.

The static response model 16 in Equation 1 can be expressed as:

$$Ax = b \quad \text{Equation 5}$$

where $$A = [I \; -G], x = \begin{bmatrix} y \\ u \end{bmatrix}, b = y_k - Gu_k, I$$

is an identity matrix, $y_k$ and $u_k$ are the current long-term trend of CV and MV that are derived as the moving average of their recent past history or heavily filtered trend values.

Procedure 42 continues at operation 52 to perform a constrained optimization. The constrained optimization may be performed on the devised cost function subject to the combined constraints with respect to the common process variable x.

$$z_{new} = \text{quadprog}(W_z - W_{x,y}, A, b, z_b z_k) \quad \text{Equation 6}$$

where quadprog is an example of a quadratic programming operation that optimizes a cost function (Equation 3) with respect to the common process variable x while also satisfying constraints specified in Equations 4 and 5.

At operation 54 of procedure 42, the optimized results ($X_{new}$) are then set as new targets for input and output variables for the controller 14 to control the production process 10. A slow transition between the current target to the new target $X_{new}$ 38 is typically achieved by passing the difference between the new and current targets through a low-pass filter. The controller 14 that takes the new targets to control the production process is typically a multivariable feedback controller such as an internal model controller or model predictive controller.

The above steps of procedure 42 can be executed while the dynamic feedback control of the production process reaches its steady state, or the new targets from the procedure 42 are slowly applied to dynamic feedback control. By doing so, the available operational zones for the variables are fully utilized, and the production goals are also effectively achieved.

Many applications for coordinating the utilization of operational zones for process control according to the present disclosure are contemplated. One application includes operation of a paper machine for weight and moisture control of the finished paper sheet. For a paper machine, instead of a traditional control that maintains the output variables such as weight and moisture of the paper sheet to their specified targets, the procedure 42 will control the process for operating the paper machine to produce the paper sheet so that the sheet weight is as close as possible to its specified low limit while not exceeding the low limit. In the meantime, procedure 42 can be used to control the process for producing the paper sheet so that the sheet moisture content is as dose as possible to its specified high limit while not exceeding its high limit. As the result, the paper machine will produce a qualified paper sheet product that utilizes lower material and energy costs.

Another application includes coordinating the utilization of operational zones for paper machine production throughput. Paper machine production throughput is often directly correlated to the speed at which the paper machine operates to output the paper sheet. However, there are design limits for every paper machine that limit its production throughput. For example, machine speed, stock flows, dry section steam pressures, and many other variables that are associated with production throughput have upper and lower limits. While the production goal is to have machine speed set as high as possible, a paper sheet must be produced that meets target settings for the output variables, such as target of weight, moisture, caliper, etc. The procedure 42 will control the process for operating the paper machine so that the paper machine operates at a speed that is as high as possible, while keeping the variables such as stock flows, steam pressures, etc. within their ranges and further achieving other variables that meet their target settings, such as sheet weight, moisture, etc. As a result, production throughput of the paper machine is maximized while producing paper sheet with the desired qualities.

Another application includes coordinating the utilization of operational zones for paper machine chemical addition. At the wet-end of a paper machine, multiple retention chemicals may be added to enhance retention capability of the wet-end process. These retention chemicals are expensive. Procedure 42 can be used to control the process for operating the paper machine to reduce retention chemical addition so that the amount of retention chemical that is added is as close as possible to its low limit, while keeping white water consistency as close as possible to, but not exceeding, its high limit. In the meantime, the procedure 42 can be used to maintain variables such as sheet weight and ash content of the paper sheet at their target settings. With this approach, procedure 42 will produce the needed quality of paper sheet by using the minimum amount of chemical addition.

Another application includes coordinating the utilization of operational zones for paper machines to produce paper sheet with proper sheet strength. Sheet strength is affected by multiple process variables such as fiber furnish, fiber refining, chemical addition, headbox jet-to-wire ratio, sheet weight, sheet moisture content, sheet caliper, and fiber orientation, etc. The production goal of reducing production costs needs to reduce usage of higher-cost fiber, minimize fiber refining, choose proper jet-to-wire setting for headbox, and control chemical dosages while achieving the minimal required sheet strength within its product specification. Procedure 42 allows the operation of a paper machine to achieve the production goal of reducing overall costs through coordinating multiple process variables within their operational zones while producing sheet strength that meets minimal specification requirements.

Another application for coordinating the utilization of operational zones for process control is during operation of a lime kiln. A lime kiln utilizes fuel burning to heat lime mud to produce quicklime. The lime quality is closely correlated with the temperature achieved in the lime kiln. To achieve cost-effective production of lime, the lime kiln should be operated at a temperature that is as high as possible without exceeding an upper limit, and leaves the burning chamber in the kiln as little excess oxygen as possible without dropping below lower limits. Meanwhile, fuel usage is kept as low as possible relative to its lower limit. Procedure 42 allows the lime kiln operation to be controlled to achieve such production goals while achieving a desired output for the lime quality at lower costs.

Another application includes the coordinating the utilization of operational zones for the brown stock washing process in a pulp mill. Brown stock washing that removes dissolved impurities in the pulp is a key step in the pulp production line. Brown stock washing process can directly affect the recovery of organic matter and inorganic chemicals. The operation of brown stock washing is a difficult balancing act among the following requirements: (a) maintain the filtration tank levels within critical limits, (b) maintain the conductivities below operational high limits, (c) maximize the outlet consistency and solids content without exceeding the high limit, and (d) utilize as little fresh water as possible. Procedure 42 allows the brown stock washing to achieve its production goals while simultaneously minimizing the operational costs and improving the washing efficiency.

Another application includes the coordinating the utilization of operational zones for chemical charges in a multi-stage bleaching process in a pulp mill. The bleaching process is an important step in ensuring the quality of the final produced pulp meets specifications, i.e. the primary quality requirements, namely kappa and brightness, are on their targets. In this process, a variety of expensive chemicals are added at various stages of the operation and it is desired to minimize the chemical dosages without affecting the pulp properties. Procedure 42 will ensure that the pulp production targets are achieved without compromising on the quality of the pulp while simultaneously prioritizing the various chemicals to minimize the overall cost of production as well as the rejected pulp.

The schematic diagrams and procedures described above are generally set forth herein. As such, the depicted order and labeled steps are indicative of representative embodiments. Other steps, orderings, combinations of steps, and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the systems, apparatus, and methods illustrated by the diagrams. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled in order to more particularly emphasize their implementation independence. For example, one or more aspects of computer control system 20 and/or operational zone coordinator 12 may be implemented as a hardware circuit comprising custom VLSI circuits or gate arrays, off-the-shelf semiconductors such as logic chips, transistors, or other discrete components. Computer control system 20 and/or operational zone coordinator 12 may also be implemented in programmable hardware devices such as field programmable gate arrays, programmable array logic, programmable logic devices or the like.

One or more aspects of computer control system 20 and/or operational zone coordinator 12 may also be implemented in machine-readable medium for execution by various types of processors. In some instances, the machine-readable medium for execution by various types of processors may be implemented in the aforementioned hardware circuit. An identified module of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the computer control system 20 and/or operational zone coordinator 12.

For example, computer readable program code may be a single instruction, or many instructions, and may even be distributed over several different code segments, among different programs, and across several memory devices. Similarly, operational data may be identified and illustrated herein within a module, monitor, or circuit, and may be embodied in any suitable form and organized within any suitable type of data structure. The operational data may be collected as a single data set, or may be distributed over different locations including over different storage devices, and may exist, at least partially, merely as electronic signals on a system or network. Where a module, monitor, or circuit or portions thereof are implemented in machine-readable medium (or computer-readable medium), the computer readable program code may be stored and/or propagated on one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave, Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present disclosure may be written in any combination of one or more programming languages, including an object oriented programming language such as Java, Smalltalk, C++ or the like and conventional procedural programming languages, such as the "C" programming language, Python, Matlab, R, or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a controller, computer, other programmable data processing apparatus, or other devices to function in a particular manner, such that the instructions stored in the computer readable medium produce an article of manufacture including instructions which implement the function/act specified herein.

Various aspects of the present disclosure are contemplated. For example, according to one aspect, a method of coordinating operational zones of common process variables in a production process is provided. The method includes categorizing preferences of each common process variable with respect to a) a target if the common process variable has a target setting; or b) one or more preferences if the common process variables does not have a target setting; determining an operational zone for each common process variable between high and low operational zone limits for each common process variable; determining a reference target for each common process variable; devising a cost function as a weighted sum of a deviation variance of each common process variable from its reference target; combining the operational zone and a response model of the common process variables as a set of combined constraints of the common process variables; performing a constrained optimization on the devised cost function subject to the set of combined constraints to determine optimized results for the common process variables; and setting the optimized results as new target settings for a multivariable feedback controller that controls the production process.

Any combination of one or more of the following may be incorporated in the method. In one embodiment, the multivariable feedback controller is one of an internal model controller or a model predictive controller. In one embodiment, a preference of set target category is provided for categorizing each of the common process variables with the target setting.

In one embodiment, preferences of categories for categorizing each of the common process variables not having the target setting includes; a preference of near high category for the common process variables to be maintained closely to the high operational zone limit which is a tolerance amount below a high limit; a preference of near low limit category for the common process variables to be maintained closely to the low operational zone limit which is a tolerance amount above a low limit; and a preference of within range category for the common process variables to be kept at any level between high and low operational zone limits. In one embodiment, the tolerance can be specified manually or calculated dynamically from the short-term variability of the difference between a current measurement acid a long-term trend of each common process variable.

In one embodiment, the operational zone of each common process variable is a region between a high limit adjusted for a high tolerance and a low limit adjusted for a low tolerance.

In one embodiment, determining the reference target for each common process variable includes: setting the reference target for each common process variable in a set target category to the target setting thereof; setting the reference target for each common process variable in a near high category to the high operational zone limit which is the high limit less the tolerance amount thereof; setting the reference target for each common process variable in a near low category to the low operational zone limit which is the low limit plus the tolerance amount thereof; and setting the reference target for each common process variable in a within range category to a current steady state value thereof.

In one embodiment, the cost function is Equation 3 above. In one embodiment, the response model is Equation 5 above. In, one embodiment, the constrained optimization on the devised cost function is Equation 6 above.

According to another aspect, a computer system is provided that is operable for coordinating the utilization of operational zones for a production process. The computer system is operable to: categorize preferences of each common process variable with respect to a) a target if the common process variable has a target setting, or b) one or more preferences if the common process variables does not have a target setting; determine an operational zone between high and low operational zone limits for each common process variable to and from the production process; determine a reference target for each common process variable; devise a cost function as a weighted Sum of a deviation variance of each common process variable from its reference target; combine the operational zone limits and the response model of the process as a set of combined constraints of the common process variables; perform a constrained optimization on the devised cost function subject to the set of combined constraints to determine optimized results for the common process variables; and set the optimized results as new target settings for a multivariable feedback controller that controls the production process.

In one embodiment, the computer system is operable to categorize each common process variable having the target setting in a preference of set target category. In one embodiment, the operational zone of each common process variable is a region between a high limit and a low limit thereof.

In one embodiment, the common process variables categorized with respect to one or more limits are placed in one of the following categories; a preference of near high category for the common process variables to be maintained within a tolerance amount below a high limit; a preference of near low limit category for the common process variables to be maintained within a tolerance amount above a low limit; and a preference of within range category for the common process variables to be kept at any level between high and low operational zone limits.

In one embodiment, the reference target is the target setting for each common process variable in the set target category; the high operational zone limit which is the high limit less the tolerance amount for each common process variable in the near high category; the low operational zone limit which is the low limit plus the tolerance amount for each common process variable in the near low category; and a current steady state value for each common process variable in the within range category.

In one embodiment, the cost function is the cost function is Equation 3 above. In one embodiment, the response model is Equation 5 above. In one embodiment, the constrained optimization on the devised cost function is Equation 6 above.

In one embodiment, the computer system is operable to set the optimized results as new targets for input variables and output variables for the multivariable feedback controller. In another embodiment, a machine is connected to the computer control system for running the production process.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "In an embodiment," and similar language throughout this specification may, but do not necessarily, all refer to the same embodiment.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method of coordinating operational zones of common process variables in a production process, the method comprising:
    categorizing preferences of each common process variable with respect to a) a target if the common process variable has a target setting, or b) one or more preferences if the common process variables does not have a target setting;
    determining an operational zone for each common process variable between high and low operational zone limits for each common process variable;
    determining a reference target for each common process variable;
    devising a cost function as a weighted sum of a deviation variance of each common process variable from its reference target;
    combining the operational zone and a response model of the common process variables as a set of combined constraints of the common process variables;
    performing a constrained optimization on the devised cost function subject to the set of combined constraints to determine optimized results for the common process variables; and
    setting the optimized results as new target settings for a multivariable feedback controller that controls the production process,
    wherein the cost function is:

$$J=(x-x_r)^T W(x-x_r),$$

where x is the common process variable including input variables and output variables, $x_4$ is the reference target for each common process variable, and W is a diagonal matrix where each diagonal element specifies a weight factor of each component of x.

2. The method of claim 1, wherein the multivariable feedback controller is one of an internal model controller or a model predictive controller.

3. The method of claim 1, wherein a preference of set target category is provided for categorizing each of the common process variables with the target setting.

4. The method of claim 1, wherein preferences of categories for categorizing each of the common process variables not having the target setting includes:
    a preference of near high category for the common process variables to be maintained closely to the high operational zone limit which is a tolerance amount below a high limit;
    a preference of near low limit category for the common process variables to be maintained closely to the low operational zone limit which is a tolerance amount above a low limit; and
    a preference of within range category for the common process variables to be kept at any level between high and low operational zone limits.

5. The method of claim 4, wherein the tolerance can be specified manually or calculated dynamically from the short-term variability of the difference between a current measurement and a long-term trend of each common process variable.

6. The method of claim 1, wherein the operational zone of each common process variable is a region between a high limit adjusted for a high tolerance and a low limit adjusted for a low tolerance.

7. The method of claim 1, wherein determining the reference target for each common process variable includes:
    setting the reference target, for each common process variable in a set target category to the target setting thereof;
    setting the reference target for each common process variable in a near high category to the high operational zone limit which is the high limit less the tolerance amount thereof;
    setting the reference target for each common process variable in a near low category to the low operational zone limit which is the low limit plus the tolerance amount thereof; and
    setting the reference target for each common process variable in a within range category to a current steady state value thereof.

8. The method of claim 1, wherein the response model is:

$$Ax=b$$

where $$A = [I \ -G]x = \begin{bmatrix} y \\ u \end{bmatrix} b = y_k - Gu_k,$$

where x is the common process variable; G is a static gain of the process; I is an identity matrix; y and u are input variables and output variables, respectively; and $y_k$ and $u_k$ are current long-term trends of the input variables and the output variables, respectively.

9. The method of claim 1, wherein the constrained optimization on the devised cost function is:

$$x_{new} = \text{quadprog}(W, -Wx_r, A, b, z_l, z_h)$$

where $x_{new}$ are the optimized results, $z_l$ and $z_h$ are the respective low and high limits of the operational zone, and quadprog is a quadratic optimization operation.

10. A computer system operable for coordinating the utilization of operational zones for a production process, the computer system comprising:

one or more processors; and a non-transitory computer-readable medium having processor-executable instructions stored thereon, wherein the processor-executable instructions, when executed by the one or more processors, facilitate:

categorizing preferences of each common process variable with respect to a) a target if the common process variable has a target setting, or b) one or more preferences if the common process variables does not have a target setting;

determining an operational zone between high and low operational zone limits for each common process variable to and from the production process;

determining a reference target for each common process variable;

devising a cost function as a weighted sum of a deviation variance of each common process variable from its reference target;

combining the operational zone limits and the response model of the process as a set of combined constraints of the common process variables;

performing a constrained optimization on the devised cost function subject to the set of combined constraints to determine optimized results for the common process variables; and setting the optimized results as new target settings for a multivariable feedback controller that controls the production process, wherein the cost function is:

$$J = (x - x_r)^T W (x - x_r),$$

where x is the common process variable including input variables and output variables, $x_r$ is the reference target for each common process variable, and W is a diagonal matrix where each diagonal element specifies a weight factor of each component of x.

11. The computer system of claim 10, wherein categorizing the preferences of each common process variable is based on categorizing each common process variable having the target setting in a preference of set target category.

12. The computer system of claim 10, wherein the common process variables categorized with respect to one or more limits are placed in one of the following categories:

a preference of near high category for the common process variables to be maintained within a tolerance amount below a high limit;

a preference of near low limit category for the common process variables to be maintained within a tolerance amount above a low limit; and a preference of within range category for the common process variables to be kept at any level between high and low operational zone limits.

13. The computer system of claim 10, wherein the operational zone of each common process variable is a region between a high limit and a low limit thereof.

14. The computer system of claim 10, wherein the reference target is:

the target setting for each common process variable in the set target category;

the high operational zone limit which is the high limit less the tolerance amount for each common process variable in the near high category;

the low operational zone limit which is the low limit plus the tolerance amount for each common process variable in the near low category; and a current steady state value for each common process variable in the within range category.

15. The computer system of claim 10, wherein the response model is:

$$Ax = b,$$

wherein $$A = [I \; -G], \; x = \begin{bmatrix} y \\ u \end{bmatrix}, \text{ and } b = y_k - Gu_k,$$

where x is the common process variable; G is a static gain of the process; I is an identity gain matrix; y and u are input variables and output variables, respectively; and $y_k$ and $u_k$ are current long-term trends of the input variables and the output variables, respectively.

16. The computer system of claim 10, wherein the constrained optimization on the devised cost function is:

$$x_{new} = \text{quadprog}(W, -Wx_r, A, b, z_l, z_h)$$

where $x_{new}$ are the optimized results, $z_l$ and $Z_h$ are the respective low and high limits of the operational zones, and quadprog is a quadratic optimization operation.

17. The computer system of claim 16, wherein setting the optimized results as the new target settings for the multivariable feedback controller that controls the production process comprises setting the optimized results as new targets for input variables and output variables for the multivariable feedback controller.

18. The computer system of claim 10, wherein the computer system is connected to a machine for running the production process.

* * * * *